(No Model.)
E. ROADIFER.
DRAFT EQUALIZER.
No. 480,517. Patented Aug. 9, 1892.
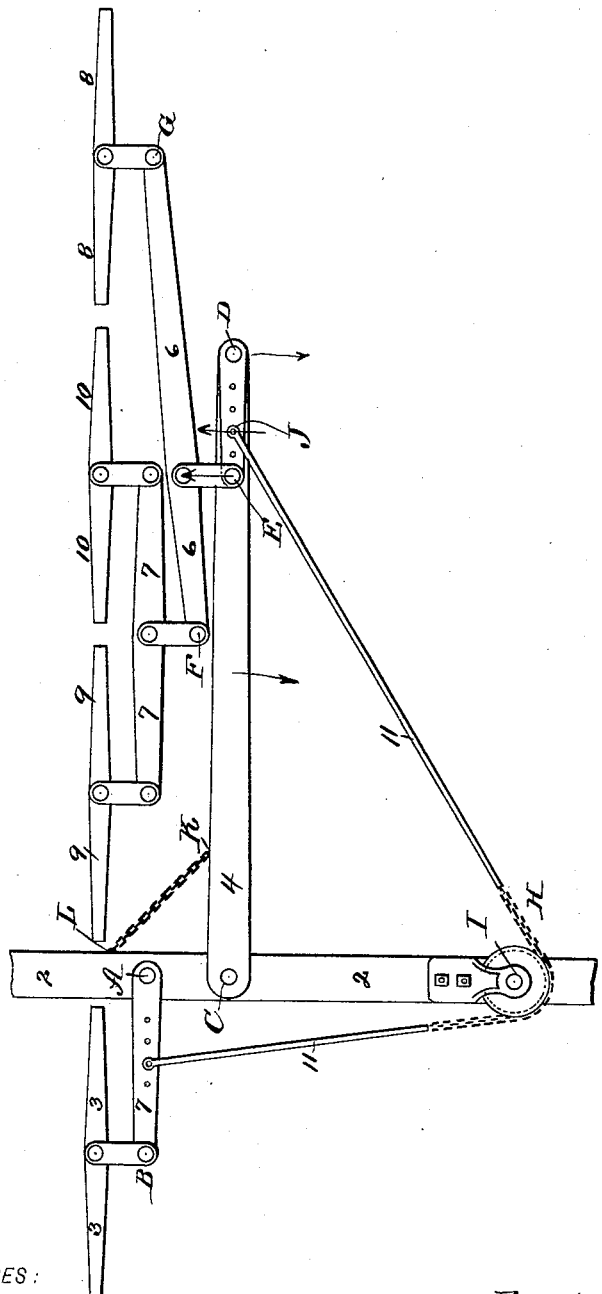
WITNESSES:
H. J. Robinson
Edw. W. Byrn.
INVENTOR:
Erastus Roadifer
BY Munn & Co
ATTORNEYS

UNITED STATES PATENT OFFICE.

ERASTUS ROADIFER, OF CARPENTER, INDIANA.

DRAFT-EQUALIZER.

SPECIFICATION forming part of Letters Patent No. 480,517, dated August 9, 1892.

Application filed November 23, 1891. Serial No. 412,896. (No model.)

*To all whom it may concern:*

Be it known that I, ERASTUS ROADIFER, a citizen of the United States, residing in Carpenter township, county of Jasper, State of Indiana, have invented a new and useful Draft-Equalizer, of which the following is a specification.

My invention relates to a three or four horse evener or equalizer. The evener or equalizer which I have invented can be used on any machinery or vehicle where it is desirable to apply more power on one side of the center of the draft or resistance than on the other; but it is especially useful and can be applied to great advantage on all reaping and mowing machines, as but one horse can be worked on such machines on the side of the tongue next to the grain or grass.

All eveners heretofore invented create an additional side draft which is not fully overcome; but with the evener I have invented all side draft occasioned by applying three-fourths of the power at one side of the tongue and at a greater distance therefrom than the one-fourth is applied is fully counteracted and also the side draft which the machine may have without reference to that occasioned by the manner of applying the propelling power. I attain these objects by the construction shown in the drawing, which represents a plan view of the device equipped for three horses on one side of the tongue and one upon the other.

The tongue is shown at 2. Upon one side of the same is arranged a short lever 1, projecting at right angles and pivoted at A to the tongue. This lever is connected by a link B at its outer end to the singletree 3. Upon the other side of the tongue and projecting at right angles is a long lever 4. This is pivoted to the tongue, but is anchored to the tongue in front by chain L K, so that said lever cannot swing rearwardly beyond a right-angular position. To the outer end of lever 4 is pivoted another shorter lever 5, which extends inwardly along lever 4 in approximately parallel position. Equalizing rods and chain 11 connect this lever 5 with the lever 1 upon the other side of the tongue, the chain passing around a pulley I, fixed upon the tongue. Through this medium the strain of the team upon one side of the tongue is transmitted to and made to balance the strain of the team upon the other side. The connections of the rods 11 with the levers 1 and 5 are made adjustable through a series of holes in said levers, so as to alter the leverage to correspond to the number of horses used. The inner or free end of lever 5 is connected by link E to an equalizing-bar 6, which is twice as long on one side of its fulcrum as it is upon the other. The long end of the bar is connected by link G with a singletree 8, and the short end is connected by link F with a doubletree 7, which in turn is connected to two singletrees 9 and 10.

I am aware that various forms of draft-equalizers have been heretofore invented in which a chain or flexible connection passes around a pulley on the tongue and connects pivoted levers on opposite sides of the tongue, and I make no broad claim to this.

My invention is distinctive in the following features, namely: In the special arrangement of the lever 5, which at its outer end is pivoted to the long lever 4 and at its inner end is connected to the team and at an intermediate point is connected by the equalizing rods and chain with the lever on the opposite side of the tongue. This special combination of parts produces very important results.

In reapers and mowers only one horse can be used on the side next to the grain, and the three horses upon the other side always produce a side draft on the tongue and single horse that force them inward into the grain. With my arrangement as described, while the strain of lever 5 on bars 11 is forward at the point J, the strain on the long lever 4 at the point D is backward, and the chain L K carries this backward strain and avoids throwing the tongue 2 over onto the single horse, and thus prevents the side draft and the horizontal wabbling of the tongue caused by the unevenness of the ground, which is so trying upon the horse next to the grain. With my arrangement it will be seen that if the three horses get ahead the swing of the lever 5 throws them further away from the tongue or causes them to trend outwardly instead of allowing them to crowd over toward the tongue and upon the single horse.

Having thus described my invention, what I claim as new, and desire to secure by Letters Patent, is—

1. The combination of the tongue having a chain or flexible connection 11, a short lever 1, and long lever 4 upon the opposite side anchored to the tongue, so that it cannot move rearwardly, a short lever 5, pivoted at its outer end to the long lever 4 and connected to the team at its inner end and at an intermediate point to the chain or flexible connection, which extends to the lever 1 upon the opposite side of the tongue, whereby the larger team is made to trend outwardly and side draft on the tongue is avoided, as described.

2. The combination, with the tongue having the right-angular levers 1 and 4 and pulley I, of the flexible connection 11, passing around the pulley and adjustably connected to lever 1, and the lever 5, adjustably connected to the other end of connection 11 and in turn pivoted at its outer end to long lever 4 and at its inner end to the team, as described.

ERASTUS ROADIFER.

Witnesses:
HENRY BUTLER, Jr.,
CHAS. SPINNEY.